United States Patent
Matsumoto et al.

(10) Patent No.: US 10,315,277 B2
(45) Date of Patent: Jun. 11, 2019

(54) ALUMINIUM ALLOY LAMINATED PLATE

(71) Applicant: Kobe Steel, Ltd., Kobe-shi (JP)

(72) Inventors: Katsushi Matsumoto, Hyogo (JP); Takahiro Izumi, Tochigi (JP)

(73) Assignee: KOBE STEEL, LTD., Kobe-shi (JP)

( * ) Notice: Subject to any disclaimer, the term of this patent is extended or adjusted under 35 U.S.C. 154(b) by 263 days.

(21) Appl. No.: 15/300,619

(22) PCT Filed: Mar. 24, 2015

(86) PCT No.: PCT/JP2015/058990
§ 371 (c)(1),
(2) Date: Sep. 29, 2016

(87) PCT Pub. No.: WO2015/151942
PCT Pub. Date: Oct. 8, 2015

(65) Prior Publication Data
US 2017/0173741 A1  Jun. 22, 2017

(30) Foreign Application Priority Data

Mar. 31, 2014 (HK) .............................. 2014-074199

(51) Int. Cl.
| | |
|---|---|
| *B23K 35/28* | (2006.01) |
| *B23K 35/02* | (2006.01) |
| *B23K 35/22* | (2006.01) |
| *B32B 15/01* | (2006.01) |
| *C22C 21/00* | (2006.01) |
| *C22F 1/04* | (2006.01) |
| *B23K 1/00* | (2006.01) |
| *B23K 1/20* | (2006.01) |
| *C22C 21/02* | (2006.01) |
| *C22C 21/12* | (2006.01) |
| *C22C 21/14* | (2006.01) |
| *C22C 21/16* | (2006.01) |
| *C22C 21/18* | (2006.01) |
| *B32B 15/04* | (2006.01) |
| *B32B 15/20* | (2006.01) |
| *F28F 19/06* | (2006.01) |

(52) U.S. Cl.
CPC .......... *B23K 35/286* (2013.01); *B23K 1/0012* (2013.01); *B23K 1/203* (2013.01); *B23K 35/0222* (2013.01); *B23K 35/0233* (2013.01); *B23K 35/0238* (2013.01); *B23K 35/22* (2013.01); *B23K 35/28* (2013.01); *B32B 15/01* (2013.01); *B32B 15/016* (2013.01); *B32B 15/043* (2013.01); *B32B 15/20* (2013.01); *C22C 21/00* (2013.01); *C22C 21/02* (2013.01); *C22C 21/12* (2013.01); *C22C 21/14* (2013.01); *C22C 21/16* (2013.01); *C22C 21/18* (2013.01); *C22F 1/04* (2013.01); *F28F 19/06* (2013.01)

(58) Field of Classification Search
None
See application file for complete search history.

(56) References Cited

U.S. PATENT DOCUMENTS

| | | |
|---|---|---|
| 2011/0014494 A1 | 1/2011 | Matsumoto et al. |
| 2012/0129003 A1 | 5/2012 | Ando et al. |
| 2013/0244051 A1 | 9/2013 | Matsumoto et al. |
| 2015/0144229 A1 | 5/2015 | Ando et al. |

FOREIGN PATENT DOCUMENTS

| | | |
|---|---|---|
| JP | 8-246117 A | 9/1996 |
| JP | 2002-126894 A | 5/2002 |
| JP | 2006-152325 A | 6/2006 |
| JP | 2009-191293 A | 8/2009 |
| JP | 2010-209444 A | 9/2010 |
| JP | 2012-17503 A | 1/2012 |
| JP | 2012-87401 A | 5/2012 |
| JP | 2013-23748 A | 2/2013 |
| JP | 2013-194243 A | 9/2013 |
| JP | 2013-194244 A | 9/2013 |

OTHER PUBLICATIONS

International Search Report dated Jun. 9, 2015 in PCT/JP2015/058990 (with English translation).
Written Opinion of the International Searching Authority dated Jun. 9, 2015 in PCT/JP2015/058990 filed Mar. 24, 2015 (with English translation).

*Primary Examiner* — Daniel J. Schleis
(74) *Attorney, Agent, or Firm* — Oblon, McClelland, Maier & Neustadt, L.L.P.

(57) ABSTRACT

Provided is an aluminum alloy laminated plate having a sacrificial material cladded to at least one side surface of a core material, wherein the core material contains specified amounts of Mn, Si, Cu, Mg, Fe, and Ti, the balance is Al and inevitable impurities, the number density of dispersed particles having a particle size of 0.01-0.5 μm is 10-100/μm³, and [(the total solid solution amount of Mg, Mn, Si, and Cu)/(the total added amount of Mg, Mn, Si, and Cu)] is 0.10 or more.

15 Claims, No Drawings

ALUMINIUM ALLOY LAMINATED PLATE

The present invention relates to a laminated aluminum alloy sheet used for a heat exchanger of an automobile, etc.

BACKGROUND ART

In general, as a tube material used for a refrigerant passage of an automotive heat exchanger such as radiator, evaporator and condenser, various laminated aluminum alloy sheets (hereinafter, sometimes referred to as "laminated sheet") obtained by cladding a brazing filler material and a sacrificial material on one surface or both surfaces of a core material are used.

The laminated sheet is suitably applied as a tube material of a heat exchanger and therefore, must have certain or higher levels of strength, corrosion resistance, erosion resistance, etc., and a large number of techniques focusing on this point have been heretofore proposed.

For example, Patent Document 1 discloses a laminated sheet where in the core material, the number density of intermetallic compounds each having a predetermined size (from 0.02 to 0.2 µm) is limited to a range of 10 to 2,000/m$^3$. According to this technique, by limiting the number density of the intermetallic compound, the strength after brazing and the corrosion resistance of the laminated sheet can be enhanced.

Patent Document 2 discloses a laminated sheet where in the core material, the number of intermetallic compounds each having a predetermined size (from 0.01 to 0.1 µm) is limited to 5 or less in a 2 µm×2 µm visual field. According to this technique, by limiting the number of intermetallic compounds in a predetermined visual field, the erosion resistance can be enhanced without deteriorating the formability of the laminated sheet.

Patent Document 3 discloses a laminated sheet where, in the core material, the average number density of precipitates in a range of 0.1 to 0.5 µm is specified to be 150/µm$^3$ or less. According to this technique, by limiting the average number density of precipitates, the fatigue properties of the laminated sheet can be improved.

PRIOR ART LITERATURE

Patent Document

Patent Document 1: JP-A-8-246117
Patent Document 2: JP-A-2002-126894
Patent Document 3: JP-A-2009-191293

SUMMARY OF THE INVENTION

Problems that the Invention is to Solve

However, the recent trend toward weight reduction of a heat exchanger of an automobile, etc. leads to a demand for more thickness reduction (more than 0.2 mm at present→0.2 mm or less) of a tube material, and therefore decrease in the strength and erosion resistance resulting from the thickness reduction must be prevented. In other words, it is required to more enhance the strength and erosion resistance of the laminated sheet.

Although it is described in detail later by comparison with the present invention, the laminated sheets according to Patent Documents above are produced by a predetermined production process and therefore, are considered to be incapable of sufficiently exerting strength and erosion resistance at levels required for the laminated sheet of a future heat exchanger of an automobile, etc.

The present invention has been made in consideration of these points, and an object thereof is to provide a laminated aluminum alloy sheet excellent in the strength (strength after brazing) and erosion resistance.

Means for Solving the Problems

The present inventors have found that when the total solid solution amount of predetermined additive elements is elaborately controlled, in addition to the control of the number density of dispersoids in the core material, the strength after brazing is enhanced. Specifically, it has been found that when the ratio of the total solid solution amount to the total addition amount of predetermined additive elements is controlled, the strength after brazing is enhanced due to aging hardening by room-temperature aging after brazing as well as solid-solution hardening by a solute element. In addition, it has been found that the total solid solution amount above can be controlled by elaborately controlling a soaking step, etc. in the production process.

More specifically, the laminated aluminum alloy sheet according to the present invention for solving the problems above is a laminated aluminum alloy sheet including a core material and a sacrificial material being clad on at least one side surface of the core material, in which the core material contains Mn: from 0.5 to 1.8 mass %, Si: from 0.4 to 1.5 mass %, Cu: from 0.05 to 1.2 mass %, and Mg: 1.0 mass % or less (including 0 mass %), and contains at least one member of Fe: more than 0 mass % and 1.0 mass % or less and Ti: more than 0 mass % and 0.3 mass % or less, with the remainder being Al and unavoidable impurities, the core material has a number density of dispersoids having a particle diameter of 0.01 to 0.5 µm of from 10 to 100/µm$^3$, and the core material has a ratio of a total solid solution amount of the Mg, the Mn, the Si, and the Cu to a total addition amount of the Mg, the Mn, the Si, and the Cu (total solid solution amount/total addition amount) of 0.10 or more.

According to the laminated aluminum alloy sheet above, while controlling the amount of each element of the core material to a predetermined amount, the ratio of the total solid solution amount to the total addition amount of predetermined additive elements is controlled to a predetermined value or more, whereby the strength after brazing can be enhanced due to aging hardening by room-temperature aging after brazing as well as solid-solution hardening by solute elements. In addition, while controlling the amount of each element of the core material to a predetermined amount, the number density of dispersoids is controlled to a predetermined value range, whereby the erosion resistance can be enhanced.

In the laminated aluminum alloy sheet according to the present invention, the core material preferably further contains at least one member of Cr: from 0.02 to 0.4 mass % and Zr: from 0.02 to 0.4 mass %.

According to the laminated aluminum alloy sheet above, predetermined amounts of Cr and Zr are incorporated, whereby reduction in the formability can be prevented and the number density of dispersoids in the core material can be increased to a predetermined value or more.

In the laminated aluminum alloy sheet according to the present invention, the core material preferably further contains Zn: more than 0 mass % and 1.0 mass % or less.

According to the laminated aluminum ally sheet above, a predetermined amount of Zn is incorporated, whereby the strength of the core material can be further increased.

It is preferred that in the laminated aluminum alloy sheet according to the present invention, the core material has, as a microstructure after a heating corresponding to a brazing of the laminated aluminum alloy sheet, a number density of dispersoids having a particle diameter of 0.01 to 0.5 µm of from 5 to 80/µm$^3$, the core material has, as the microstructure, an average grain size in a rolling direction, in a longitudinal cross-section along the rolling direction, of 50 µm or more, and the core material has, as the microstructure, a ratio of a total solid solution amount of the Mg, the Mn, the Si, and the Cu to a total addition amount of the Mg, the Mn, the Si, and the Cu (total solid solution amount/total addition amount) of 0.14 or more.

According to the laminated aluminum alloy sheet above, with respect to the microstructure of the core material after heating corresponding to brazing, the number density of dispersoids, the average grain size and the ratio of the total solid solution amount to the total addition amount of predetermined additive elements are further controlled, whereby the strength (strength after brazing) and the erosion resistance can be more reliably enhanced.

Advantage of the Invention

According to the laminated aluminum alloy sheet of the present invention, while controlling the amount of each element of the core material to a predetermined amount, with respect to the microstructure of the core material, the number density of dispersoids and the ratio of the total solid solution amount to the total addition amount of predetermined additive elements are controlled, so that the strength (strength after brazing) and the erosion resistance can be enhanced.

Mode for Carrying out the Invention

The laminated aluminum alloy sheet according to the embodiment s described in detail below.
<<Laminated Aluminum Alloy Sheet>>

The laminated aluminum alloy sheet (brazing sheet) is a sheet material used for, e.g., a member of a heat exchanger of an automobile, etc. and is a sheet material where a sacrificial material is clad on at least one side surface of a core material. It generally has a three-layer structure consisting of a core material, a sacrificial material clad on one side surface of the core material and a blazing filler material clad on another side surface of the core material, but may have a four-layer structure where one more layer of an aluminum alloy material is clad between the core material and the brazing filler material.
<Core Material>

The core material contains Mn: from 0.5 to 1.8 mass %, Si: from 0.4 to 1.5 mass %, Cu: from 0.05 to 1.2 mass %, Mg: 1.0 mass % or less (including 0 mass %), and contains at least one member of Fe: more than 0 mass % and 1.0 mass % or less and Ti: more than 0 mass % and 0.3 mass % or less, with the remainder being Al and unavoidable impurities. In the core material, the number density of dispersoids having a predetermined particle diameter is from 10 to 100/µm$^3$, and the ratio of the total solid solution amount to the total addition amount of predetermined additive elements (total solid solution amount/total addition amount) is 0.10 or more.

The core material preferably further contains at least one member of Cr: from 0.02 to 0.4 mass % and Zr: from 0.02 to 0.4 mass % and further contains Zn: more than 0 mass % and 1.0 mass % or less.

The reasons for limiting numerical values regarding each composition of the core material, the number density of dispersoids, and the ratio of the total solid solution amount to the total addition amount of predetermined additive elements in the laminated aluminum alloy sheet according to the present invention are described below.
(Mn: From 0.5 to 1.8 Mass %)

Mn is an element for allowing dispersoids of the predetermined size specified by the present invention to be distributed in an aluminum alloy sheet and enhancing the strength by dispersion hardening without deteriorating the corrosion resistance of the core material. Accordingly, in order to ensure the strength required for a laminated sheet before and after heating corresponding to brazing, Mn is incorporated in an amount of 0.5 mass % or more.

On the other hand, if the Mn content is too large, this element may work out to a starting point of crack initiation in plastic deformation, or the number density of coarse Al—Fe—Mn—Si dispersoids may be increased to deteriorate the formability of the laminated sheet and to cause breakage of the laminated sheet during processing such as assembly into a component shape. Therefore, the Mn content is set to 1.8 mass % or less.

The Mn content range is therefore set to be a range of from 0.5 to 1.8 mass %.
(Si: From 0.4 to 1.5 Mass %)

Si forms a solid solution in the matrix to provide the strength necessary for the core material (a member for a heat exchanger). However, since Si is also consumed by an Al—Mn—Si dispersoid, Si is incorporated in an amount of 0.4 mass % or more also for ensuring the solute Si amount. In addition, Si also has an effect of increasing the strength of the core material particularly by forming the Al—Mn—Si dispersoid above. If the Si content is less than 0.4 mass %, the above-described effect cannot be sufficiently obtained. On the other hand, if the Si content is too large, the melting point of the core material is lowered, and due to an increase in a low-melting-point phase, melting of the core material occurs in brazing. Therefore, the Si content is set to 1.5 mass % or less.

The Si content range is therefore set to be a range of from 0.4 to 1.5 mass %.
(Cu: From 0.05 to 1.2 Mass %)

Cu is an element for increasing the strength of the core material by existing in a solid-solution state in the aluminum alloy sheet and also enhances the corrosion resistance on the brazing filler material side. Accordingly, for ensuring the strength required for a laminated sheet before and after heating corresponding to brazing, it incorporated in an amount of 0.05 mass % or more.

On the other hand, if the Cu content is too large, a coarse Cu compound precipitates in the grain boundary during cooling after heating corresponding to brazing, making it likely for grain boundary corrosion to occur, and the corrosion resistance as a laminated sheet after heating corresponding to brazing is reduced. In addition, since the melting point of the core material lowers, melting of the core material is caused during brazing. Accordingly, the Cu content is set to 1.2 mass % or less.

The Cu content range is therefore set to be a range of from 0.05 to 1.2 mass %.
(Mg: 1.0 Mass % or Less (Including 0 Mass %))

Mg has an effect of increasing the strength of the core material, but if its content is large, diffusion of Mg greatly affects the brazing filler material and, for example, in a Nocolok brazing method using a fluoride-based flux, the Mg reacts with a fluoride-based flux applied onto the brazing filler material surface in brazing, as a result, the brazing property is significantly reduced.

Therefore, the Mg content range is set to 1.0 mass % or less (including 0 mass %)

In the case of a laminated sheet for a heat exchanger, where the brazing property is deteriorated by Mg, the Mg content is preferably restricted to 0.8 mass % or less.

The lower limit value of the Mg content is preferably 0.05 mass % and more preferably 0.1 mass %.

(Fe: More than 0 Mass % and 1.0 Mass % or Less)

Fe is inevitably contained as an impurity in the core material as long as scraps are used as the aluminum alloy melting raw material. Fe forms an intermetallic compound with Si to increase the strength of the core material and also has an effect of enhancing the brazing property of the core material. However, if the content thereof is too large, the self-corrosion resistance of the core material is significantly reduced. In addition, a coarse compound may be formed to deteriorate the formability of the laminated sheet and to cause breakage of the laminated sheet during processing such as assembly into a component shape.

Therefore, the Fe content range is set to be more than 0 mass % and 1.0 mass % or less.

The lower limit value of the Fe content is preferably 0.01 mass % and more preferably 0.05 mass %, and the upper limit is preferably 0.8 mass % and more preferably 0.5 mass %.

(Ti: More than 0 Mass % and 0.3 Mass % or Less)

Ti has a function of forming a fine intermetallic compound in the aluminum alloy sheet and enhancing the corrosion resistance of the core material. However, if the Ti content is too large, a coarse compound may be formed to deteriorate the formability of the laminated sheet and to cause breakage of the laminated sheet during processing such as assembly into a component shape.

Therefore, the Ti content range is set to be more than 0 mass % and 0.3 mass % or less.

When Ti is added, it precipitates in layer form in the core material to suppress the progress of pitting corrosion in the depth direction and at the same time, the addition of Ti can shift the electric potential of the core material to a noble side. Furthermore, Ti exhibits a small diffusion rate in the aluminum alloy and moves little during brazing, and the addition of Ti thus provides an effect of maintaining a potential difference between the core material and the brazing filler material or between the core material and the sacrificial material and thereby electrochemically preventing corrosion of the core material. In order to ensure the corrosion resistance required for a laminated sheet before and after heating corresponding to brazing, this element is preferably incorporated in an amount of 0.03% or more.

The upper limit value of the Ti content is preferably 0.2 mass % and more preferably 0.1 mass %.

The brazing property and corrosion resistance of the laminated sheet can be enhanced by incorporating at least one member of Fe and Ti in the content range above.

(Cr: From 0.02 to 0.4 Mass %, Zr: From 0.02 to 0.4 Mass %)

Cr and Zr are elements for distributing precipitates (intermetallic compounds) in a submicron-level size of 100 nm or less in terms of the equivalent-circle diameter in the aluminum alloy sheet, and at least one of these is incorporated. Among these, Zr is particularly most effective for distributing fine dispersoids in the aluminum alloy sheet. If each of Cr and Zr is less than the specified lower limit amount, fine dispersoids cannot be sufficiently distributed, failing in obtaining the effect of enhancing the strength by dispersion hardening. If each of Cr and Zr is in a too large amount exceeding the specified upper limit, a coarse compound may be formed to deteriorate the formability of the laminated sheet and to cause breakage of the laminated sheet during processing such as assembly into a component shape.

Therefore, in the case of incorporating Cr and Zr, Cr is preferably in a range of from 0.02 to 0.4 mass % and Zr is preferably in a range of from 0.02 to 0.4 mass %.

(Zn: More than 0 Mass % and 1.0 Mass % or Less)

Zn has an effect of increasing the strength of the core material by precipitation hardening. However, Zn has an action of causing the matrix to have a less noble electric potential and be preferentially corroded and therefore, if the content of Zn in the core material is large, the difference in electric potential between the sacrificial material provided as a preferential corrosion layer and the core material becomes small, leading to deterioration of the corrosion resistance.

Therefore, in the case of incorporating Zn, the Zn content range is preferably more than 0 mass % and 1.0 mass % or less.

The lower limit value of the Zn content is preferably 0.01 mass % and more preferably 0.05 mass %. The upper limit value is preferably 0.8 mass % and more preferably 0.5 mass %.

(Remainder being Al and Unavoidable Impurities)

Other than the above, the components of the core material contain the remainder being Al and unavoidable impurities. Unavoidable impurities include, for example, V and B, in addition to the above-described Cr, Zr and Zn which are selectively added.

(Number Density of Dispersoids)

In the core material of the laminated sheet before heating corresponding to brazing, the number density of dispersoids having a particle diameter of 0.01 to 0.5 µm is from 10 to 100/µm$^3$.

If the number density of dispersoids of the core material in the laminated sheet before heating corresponding to brazing lies outside the specified range above, the number density of dispersoids of the core material in the laminated sheet after heating corresponding to brazing does not fall in a specified range described later. The reason for specifying the range above is described in detail later.

The dispersoid as used in the present invention is a generic term of intermetallic compounds, which can be distinguished by the above-described size through microstructure observation irrespective of forming elements (composition), and which are an intermetallic compound of alloy elements, such as Si, Cu, Mn, and Ti, and/or elements contained, such as Fe and Mg, or an intermetallic compound of such an element and Al.

(Ratio of Total Solid Solution Amount to Total Addition Amount of Predetermined Additive Elements)

In the core material of the laminated sheet before heating corresponding to brazing, the ratio of total solid solution amount of Mg, Mn, Si, and Cu to the total addition amount of Mg, Mn, Si, and Cu (total solid solution amount/total addition amount) of the core material is set to 0.10 or more. The upper limit thereof is set to about 0.7.

If the (total solid solution amount/total addition amount) in the core material of the laminated sheet before heating corresponding to brazing lies outside the specified range above, the (total solid solution amount/total addition amount) in the core material of the laminated sheet after heating corresponding to brazing does not fall in a specified range described later. The reason for specifying the range above is described in detail later.

<Sacrificial Material and Brazing Filler Material>

The sacrificial material (sacrificial anti-corrosive material, sacrificed material, lining material, skin material) and the brazing filler material (brazing material) are not particularly limited.

As to the sacrificial material, for example, a known sacrificial material aluminum alloy containing Zn, such as 7000-series aluminum alloy, e.g., JIS7072, composed of an Al—Zn composition that has been conventionally used for general purposes, can be used.

As to the brazing filler material, for example, a known brazing filler material aluminum alloy, such as 4000-series Al—Si alloy brazing filler material, e.g., JIS4043, 4045 or 4047, having an Al—Si composition that has been conventionally used for general purposes, can be used.

The laminated aluminum alloy sheet after heating corresponding to brazing according to the embodiment is described below.

The heating corresponding to brazing as used in the present invention indicates heating simulating brazing usually performed when processing a laminated sheet into a member (tube material) for a heat exchanger and is a heat treatment where after applying a pre-strain of 10%, heating at a temperature of 600° C. for 3 minutes and holding are performed and then cooling at an average cooling rate of 100° C./min is performed.

<Core Material after Heating Corresponding to Brazing>

In the case of subjecting the laminated sheet to heating corresponding to brazing, the composition of chemical components of the core material does not change. However, the number density of dispersoids in the core material decreases compared with that before heating corresponding to brazing, because solid solution formation proceeds by the heating and the dispersoid grows. In addition, the ratio of the total solid solution amount to the total addition amount of predetermined additive elements increases compared with that before heating corresponding to brazing, because solid solution formation proceeds by the heating.

(Number Density of Dispersoids)

With respect to the core material of the laminated sheet after heating corresponding to brazing, the number density of dispersoids having a particle diameter of 0.01 to 0.5 µm is from 5 to 80/µm³.

If the average number density of dispersoids of the core material in the laminated sheet after heating corresponding to brazing lies below the lower limit of the specified range above, the effect of increasing the strength by the dispersion hardening of dispersoids cannot be obtained. In addition, the effect of growth of a recrystallized particle after heating corresponding to brazing and an effect of obtaining a pancake-like grain are not provided and consequently, the effect of suppressing erosion cannot be obtained.

On the other hand, if the average number density of dispersoids in the aluminum alloy sheet as a core material of the laminated sheet after heating corresponding to brazing exceeds the upper limit of the specified range above, the contents of various elements (Mn, Mg, Cu, Si) in the dispersoid are increased, and therefore the solid solution amounts of these elements in the matrix are relatively decreased, as a result, the strength after brazing is reduced.

(Ratio of Total Solid Solution Amount to Total Addition Amount of Predetermined Additive Elements)

With respect to the core material of the laminated sheet after heating corresponding to brazing, the ratio of total solid solution amount of Mg, Mn, Si, and Cu to the total addition amount of Mg, Mn, Si, and Cu (total solid solution amount/total addition amount) of the core material is set to 0.14 or more.

If the (total solid solution amount/total addition amount) of the core material of the laminated sheet after heating corresponding to brazing lies below the lower limit of the specified range above, the strength-increasing effect by solid-solution hardening or room-temperature aging hardening cannot be obtained.

The upper limit of the (total solid solution amount/total addition amount) is not provided, and theoretically the case where all additive elements are dissolved in solid (total solid solution amount/total addition amount is 1.0) is the upper limit, but an insoluble compound is formed in practice. The upper limit of total solid solution amount/total addition amount is practically about 0.7.

(Average Grain Size)

With respect to the core material of the laminated sheet after heating corresponding to brazing, the average grain size (average grain size in the rolling direction, in a longitudinal cross-section along the rolling direction) of the core material is preferably 50 µm or more.

If the average grain size of the core material of the laminated sheet after heating corresponding to brazing is miniaturized, the erosion resistance of the laminated sheet decreases. Accordingly, in the core material of the laminated sheet after hating corresponding to brazing, the average grain size in the rolling direction, in a longitudinal cross-section along the rolling direction, is preferably grown to 50 µm or more and more preferably 80 µm or more.

On the other hand, if the average grain size is too large, the strength after brazing is reduced. For this reason, it is preferably 250 µm or less and more preferably 200 µm or less.

For growing the average grain size of the core material of the laminated sheet after heating corresponding to brazing to a predetermined size or more, it can be coped with by controlling the number density of dispersoids of the core material at the stage of a laminated sheet before being subjected to heat hysteresis during brazing (before heating corresponding to brazing) to fall in the specified range above.

The microstructure of the core material at the stage of a laminated sheet before heating corresponding to brazing is not necessarily a recrystallized microstructure and may be in a state where the average grain size cannot be specified. However, since it is known that in either case, the average grain size of the core material in the laminated sheet after heating corresponding to brazing, formed by the behaviors of recrystallization and grain growth during heating corresponding to brazing, is significantly affected by the number density of dispersoids of the core material in the laminated sheet before heating corresponding to brazing, the average grain size of the core material at the stage of a laminated sheet before heating corresponding to brazing is not specified in particular.

The method for manufacturing the laminated aluminum alloy sheet according to the embodiment is described below.

<<Manufacturing Method of Laminated Aluminum Alloy Sheet>>

First, a core material, a sacrificial material and a brazing filler material, which are materials of the laminated aluminum alloy sheet, are manufactured.

The methods for manufacturing a core material, a sacrificial material and a brazing filler material are not particularly limited. For example, an aluminum alloy for a core material having the above-described composition is cast at a predetermined casting temperature, and the obtained slab is then scalped to a desired thickness and subjected to a homogenization heat treatment, whereby the core material can be manufactured. In addition, each of an aluminum alloy for a sacrificial material and an aluminum alloy for a brazing filler material having a predetermined composition is cast at a predetermined casting temperature, and the obtained slab is scalped to a desired thickness and subjected to a homogenization heat treatment.

Thereafter, the sacrificial material is stacked on one side surface of the core material and the brazing filler material is stacked on another side surface thereof, followed by cladding, to form a sheet material. This sheet material is subjected to hot rolling and to cold rolling while applying intermediate annealing so as to manufacture a laminated sheet.

<Manufacturing Conditions>

In order to increase the solid solution amount while appropriately controlling the number density of dispersoids of the core material, the soaking step needs to be elaborately controlled.

Specifically, the average temperature rise rate in a high-temperature region during temperature rise is controlled to a predetermined range so as to increase the solid solution amount in a high-temperature region during soaking and suppress the formation of a coarse precipitate. In detail, the temperature is raised at an average temperature rise rate of 20° C./hr or more and 200° C./hr or less in a temperature region of 400° C. or more. Fine precipitates produced in a temperature region of less than 400° C. in the temperature rising process are encouraged to form a solid solution in the subsequent temperature rising process, and when the temperature is raised at the temperature rise rate above in a temperature region of 400° C. or more where the diffusion rate of atoms is also high and the precipitate is consequently liable to grow, the solid-solution formation of precipitate is accelerated while suppressing growth/remaining of fine precipitates, and the solid solution amount can be increased. As a result, it acts in a direction of increasing the ratio of the total solid solution amount to the total addition amount of predetermined additive elements.

An average temperature rise rate exceeding 200° C./hr in a temperature region of 400° C. or more leads to enormous power consumption and is not practical in industry. If the average temperature rise rate is less than 20° C./hr, a large number of fine precipitates formed at less than 400° C. readily grow due to a decrease in the temperature rise rate, and coarse precipitates are likely to remain in solid solution formation in a high temperature region of 400° C. or more. Consequently, the solid solution amount is decreased, and the ratio of the total solid solution amount to the total addition amount of predetermined additive elements falls below the desired range. More preferably, in the temperature region of 400° C. or more, the temperature is preferably raised at an average temperature rise rate of 30° C./hr or more and 200° C./hr or less.

The soaking temperature is set to 450° C. or more, whereby an $Mg_2Si$, Al—Mg—Cu—Si compound, etc. can be dissolved in solid during soaking and the solid solution amount of other insoluble compounds such as Al—Mn compound can also be increased. As a result, it acts in a direction of increasing the ratio of the total solid solution amount to the total addition amount of predetermined additive elements. The temperature is more preferably 480° C. or more.

Cold rolling, annealing, etc. are applied after hot rolling, and the temper thereof may be either an H1n process (intermediate annealing is carried out during cold rolling and the finish is cold rolling) or an H2n process (without applying intermediate annealing during cold rolling, final annealing is carried out after cold rolling).

<<Member for Heat Exchanger>>

For processing the laminated aluminum alloy sheet according to the embodiment into a member for a heat exchanger, the laminated sheet is bent in the width direction by a forming roll, etc., formed in a flat tube shape so that the skin material is provided on the tube inner surface side, and then formed in a flat tube shape by electric sewing welding, etc., whereby a tube material can be manufactured.

The flat tube-shaped tube material (laminated member) is produced (assembled) as a heat exchanger, such as radiator, integrally with other members, such as corrugated radiating fin and header, by brazing. The portion where the tube material (laminated member) and the radiating fin are integrated is sometimes referred to as a core of the heat exchanger. Here, brazing treatment is carried out by heating at a high temperature of 585 to 620° C., preferably from 590 to 600° C., which is not less than the solidus temperature of the brazing filler material. As for the brazing technique, a flux brazing method, a Nocolok brazing method using a non-corrosive flux, etc. are used for general purposes.

The conditions in each of measurements of the number density of dispersoids, the ratio of the total solid solution amount to the total addition amount of predetermined additive elements, and the average grain size are described below.

<<Conditions in Each Measurement>>

<Conditions in Measurement of Number Density of Dispersoids>

A specimen is sampled from the sheet-thickness center of the core material and after mechanically polishing the specimen surface by 0.05 to 0.1 mm, followed by electrolytically etching to finish as a specimen for TEM observation. By observing dispersoids with FE-TEM (transmission electron microscope) at 50,000 power, the particle diameter and number density of dispersoids are measured.

The number density per unit volume of dispersoids is obtained by converting the number density of dispersoids relative to the area of visual fields in TEM observation to a number density per unit volume, by measuring and calculating the thickness t of the specimen for TEM observation according to a known contamination spot method.

The microstructure observation by FE-TEM at the sheet-thickness center of the core material is performed such that the total area of observation visual fields becomes 4 $\mu m^2$ or more per one place of sheet-thickness center, and observations are carried out at ten places spaced by an appropriate distance in the width direction (a direction perpendicular to rolling) of the sheet. The number density per unit volume of precipitates having a particle diameter in a range of 0.01 to 0.5 $\mu m$ is determined for each place by analyzing respective images, and they are averaged to calculate the number density (average number density) per unit volume.

The particle diameter of a dispersoid as used in the present invention is a diameter by gravitational center and is a size when converted to an equivalent-circle diameter of dispersoid per one dispersoid (circle diameter: a diameter of an equivalent circle).

<Conditions in Measurement of Ratio of Total Solid Solution Amount to Total Addition Amount of Predetermined Additive Elements>

It has been conventionally difficult to directly measure the solid solution amount of an alloy element in a metal, not limited to in an aluminum alloy, and for measuring and specifying the solid solution amount, a residue extraction method using hot phenol is employed for general purposes. The residue extraction method using hot phenol is as follows.

First, a test piece of the core material in a given amount of a laminated sheet (laminated sheet before heating corresponding to brazing) or of a member for a heat exchanger (laminated sheet after heating corresponding to brazing) is dissolved in hot phenol. The resulting solution is filtered through a filter having a mesh size of 0.1 μm, and a residue having a particle size of more than 0.1 μm, which remains on the filter, and a filtrate are separated. Thereafter, the total content of respective alloy elements of Si, Cu, Mn, and Mg in the filtrate (a solution after separating a residue composed of removed particles having a size of more than 0.1 μm) is regarded as the total solid solution amount and quantitatively determined by fluorescent X-ray analysis, etc.

In the filtrate, together with respective alloy elements actually dissolved in solid, a slight amount of dispersoids having a particle size of 0.1 μm or less, which is crystallized and precipitated (not dissolved in solid) in the microstructure, are also contained. However, in the residue extraction method using hot phenol, these are also regarded as being concurrently dissolved in solid.

<Conditions in Measurement of Average Grain Size>

The grain size as used in the present invention is a grain size in the rolling direction, in a longitudinal cross-section along the rolling direction (a cross-section of the sheet cut along the rolling direction).

First, the longitudinal cross-section along the rolling direction of a test piece (sampled specimen) of the core material in a member (a laminated sheet after heating corresponding to brazing) for a heat exchanger is pretreated by mechanical polishing and electrolytic etching and then observed by using a 50-power optical microscope. Here, it is measured by an intercept method (line intercept method) where after drawing a straight line in the rolling direction, the length of an intercept of individual grains located on the straight line is measured as an individual grain size. This is measured at arbitrary ten places, and the average grain size is calculated. Here, on the conditions that the length of one measurement line is 0.5 mm or more and the number of measurement lines per visual field is 3, five visual fields are observed per measurement place. The average grain sizes sequentially measured for every measurement line are averaged in sequence for every one visual field (three measurement lines), for every five visual fields in one measurement place, and for every ten measurement places to determine the average grain size as used in the present invention.

EXAMPLES

The present invention is described more specifically below by referring to Examples, but the present invention is not limited to these Examples and can be implemented by appropriately adding changes as long as the gist described above and below is observed, and these all are included in the technical scope of the present invention.

<Manufacture of Laminated Sheet>

The laminated sheet was manufactured as follows.

A 3000-series aluminum alloy composition having the composition of A to V shown in Table 1 was melted and cast to manufacture an aluminum alloy core material slab. As for only this core material slab, the solid solution amount of an alloy element was controlled by variously changing the soaking temperature as shown in Table 2.

Thereafter, on one surface of the core material slab, a JIS7072 aluminum alloy sheet composed of an Al-1 wt % Zn composition was clad as a sacrificial anti-corrosive material, and on another surface thereof, a JIS4045 aluminum alloy sheet composed of an Al-10 wt % Si composition was clad as a brazing material.

The clad sheet above was hot-rolled and to cold-rolled while applying intermediate annealing to obtain a laminated sheet as an H14 temper material or an H24 temper material. In applying each treatment, in each Example, the soaking temperature was variously changed together with the average temperature rise rate during soaking as shown in Table 2 so as to control the solid solution amount of an alloy element, whereby a laminated sheet before brazing was produced. In addition, holding during soaking was performed for 6 hr in either case, and holding during reheating was performed for 2 hr. Except for certain Example (Comparative Example No. 32), rough annealing after hot rolling was omitted. In the H14 temper process, as the intermediate annealing conditions, annealing of 400° C.×4 hr was applied in a batch furnace. The temperature rise/drop rate in the case was 40° C./hr.

In Table 2, the temper process of Example Nos. 1 to 13 and Comparative Example Nos. 19 to 28, 31 and 33 is an H14 temper process, and the temper process of Example Nos. 14 to 18 and Comparative Example Nos. 29, 30 and 32 is an H24 temper process.

Commonly in each Example, the sheet thickness of the core material was 0.14 mm, and both the brazing filler material and the sacrificial material stacked respectively on one surface and another surface of the core material had a thickness in the range of 15 to 30 μm.

Comparative Example No. 31 is a laminated sheet manufactured by the method described in Patent Document 1, Comparative Example No. 32 is a laminated sheet manufactured by the method described in Patent Document 2, and Comparative Example No. 33 is a laminated sheet manufactured by the method described in Patent Document 3. With respect to Comparative Example No. 32, the time after the completion of reheating until starting hot rolling was set to 30 minutes and, as rough annealing conditions, a heat treatment of 450° C.×3 hr and a heat treatment of 350° C.×10 hr were further applied. Furthermore, the final annealing after cold rolling was performed at a temperature rise rate of 20° C./hr.

TABLE 1

| Division | Code | Component Composition of Core Material Al Alloy Sheet (mass %, remainder: Al) | | | | | | | | |
|---|---|---|---|---|---|---|---|---|---|---|
| | | Mn | Si | Cu | Mg | Fe | Ti | Cr | Zr | Zn |
| Ex. | A | 1.1 | 0.7 | 0.8 | — | 0.1 | — | — | — | — |
| | B | 1.0 | 0.6 | 0.8 | — | 0.1 | 0.1 | — | — | — |
| | C | 1.0 | 0.9 | 0.8 | — | 0.1 | 0.1 | — | — | — |
| | D | 1.0 | 0.8 | 0.7 | 0.2 | 0.1 | 0.1 | — | 0.02 | — |
| | E | 1.0 | 0.9 | 0.6 | 0.3 | 0.1 | 0.1 | — | 0.1 | — |
| | F | 0.8 | 1.2 | 0.7 | — | 0.1 | 0.1 | — | 0.3 | — |

TABLE 1-continued

| Division | Code | Component Composition of Core Material Al Alloy Sheet (mass %, remainder: Al) | | | | | | | | |
|---|---|---|---|---|---|---|---|---|---|---|
| | | Mn | Si | Cu | Mg | Fe | Ti | Cr | Zr | Zn |
| | G | 1.0 | 1.5 | 0.05 | 0.35 | 0.3 | 0.1 | 0.03 | 0.4 | — |
| | H | 1.0 | 0.7 | 0.5 | 0.1 | 0.1 | 0.1 | 0.1 | 0.15 | — |
| | I | 1.2 | 0.8 | 1.1 | — | 0.1 | 0.1 | 0.15 | — | — |
| | J | 0.5 | 0.4 | 1.2 | 0.25 | 1.0 | 0.1 | 0.4 | 0.1 | 0.2 |
| | K | 1.7 | 0.5 | 0.3 | 0.8 | 0.5 | 0.1 | — | — | — |
| | L | 1.4 | 0.5 | 0.4 | 0.4 | 0.1 | 0.03 | — | 0.1 | — |
| | M | 1.0 | 0.8 | 0.7 | — | 0.1 | 0.3 | 0.1 | — | 0.8 |
| | N | 1.4 | 0.8 | 0.5 | — | 0.1 | 0.1 | — | — | — |
| Com. Ex. | O | 1.0 | 0.25 | 0.7 | — | 0.1 | 0.1 | — | 0.15 | — |
| | P | 1.0 | 0.8 | — | — | 0.1 | 0.1 | — | 0.15 | — |
| | Q | 0.4 | 0.7 | 0.7 | — | 0.1 | 0.1 | — | 0.15 | — |
| | R | 1.0 | 0.8 | 0.8 | — | 1.2 | 0.1 | — | 0.1 | — |
| | S | 2.0 | 0.9 | 0.7 | — | 0.1 | — | — | 0.6 | — |
| | T | 0.8 | 0.8 | 1.4 | — | 0.1 | 0.1 | 0.6 | — | — |
| | U | 1.0 | 1.2 | 0.6 | 0.2 | 0.1 | 0.5 | — | — | — |
| | V | 1.0 | 1.8 | 0.7 | — | 0.1 | 0.1 | 0.1 | 0.15 | 1.2 |

<Composition of Core Material>

After the production of the laminated material, the microstructure of the core material portion at the stage of a material (before being assembled to form a heat exchanger) was measured. Furthermore, brazing in processing of the laminated sheet into a member (tube material) for a heat exchanger was simulated by applying a pre-strain of 10% and thereafter, performing a heat treatment including heating at a temperature of 600° C. for 3 minutes, holding and then cooling at an average cooling rate of 100° C./min, and the microstructure of the core material portion of the laminated sheet after this heat treatment was measured.

<Other Measured Values of Core Material>

The number density of dispersoid of the core material, the solid solution amount ratio (total solid solution amount total addition amount) of the core material, and the average grain size of the core material were measured based on the measurement conditions described above.

<Mechanical Properties>

With respect to each Example after the heat treatment simulating brazing, the tensile strength (MPa) was measured by performing a tensile test. As for the test conditions, the tensile test was performed by sampling a JIS Z2201 No. 5 test piece (25 mm×50 mmGL×sheet thickness) in a direction parallel to the rolling direction from each laminated sheet. In the tensile test, the test was performed at room temperature of 20° C. according to JIS Z2241 (1980) (Method for Tensile Test of Metal Material). The crosshead speed was 5 mm/min, and the test was performed at a constant speed until the test piece was fractured.

<Erosion Resistance>

With respect to each Example, the erosion resistance was evaluated by measuring the erosion depth. The laminated sheet before heating corresponding to brazing was coated with from 3 to 5 g/m² of a commercially available non-corrosive flux and held at 600° C. for 5 minutes or more in an atmosphere having an oxygen concentration of 200 ppm or less to manufacture a brazing test piece. The longitudinal cross-section along the rolling direction of the laminated sheet having subjected to heating corresponding to brazing was pretreated by mechanical polishing and electrolytic etching and then observed in five visual fields by means of a 100-power optical microscope. The penetration depth (erosion depth) of the brazing filler material into the core material was measured in those five visual fields, and the erosion depth (μm) was determined as an average value thereof.

These results are shown in Table 2.

TABLE 2

| | | Laminated Aluminum Alloy Sheet | | | | | | Laminated Aluminum Alloy Sheet After Heating Corresponding to Brazing | | | | |
|---|---|---|---|---|---|---|---|---|---|---|---|---|
| Division | No. | Code of Core Material Composition of Table 1 | Average Temperature Rise Rate in Soaking (400° C. or more) (° C./hr) | Soaking Temperature (° C.) | Temper | Number Density of Dispersoids of Core Material (/μm³) | Solid Solution Amount Ratio of Core Material Al Alloy Sheet | Average Grain Size of Core Material (μm) | Number Density of Dispersoids of Core Material (/μm³) | Solid Solution Amount Ratio of Core Material Al Alloy Sheet | Tensile Strength (MPa) | Erosion Depth (μm) |
| Ex. | 1 | A | 25 | 550 | H1n | 10.6 | 0.11 | 54 | 5.1 | 0.12 | 181 | 39 |
| | 2 | B | 32 | 490 | H1n | 11.9 | 0.11 | 90 | 6.3 | 0.15 | 182 | 33 |
| | 3 | C | 30 | 510 | H1n | 10.1 | 0.12 | 84 | 5.2 | 0.16 | 185 | 34 |
| | 4 | D | 40 | 530 | H1n | 10.8 | 0.18 | 88 | 5.6 | 0.21 | 218 | 35 |
| | 5 | E | 120 | 595 | H1n | 12.9 | 0.22 | 131 | 7.9 | 0.27 | 235 | 29 |
| | 6 | F | 30 | 535 | H1n | 12.1 | 0.14 | 118 | 7.1 | 0.18 | 207 | 34 |
| | 7 | G | 80 | 545 | H1n | 24.6 | 0.26 | 132 | 19.7 | 0.33 | 241 | 28 |
| | 8 | H | 45 | 510 | H1n | 30.7 | 0.16 | 98 | 25.2 | 0.19 | 223 | 34 |
| | 9 | I | 155 | 590 | H1n | 13.2 | 0.27 | 138 | 8.1 | 0.31 | 214 | 33 |
| | 10 | J | 30 | 570 | H1n | 10.8 | 0.18 | 57 | 7.4 | 0.20 | 232 | 39 |
| | 11 | K | 130 | 600 | H1n | 24.4 | 0.42 | 163 | 18.9 | 0.46 | 249 | 21 |
| | 12 | L | 110 | 550 | H1n | 18.5 | 0.31 | 149 | 14.3 | 0.38 | 244 | 24 |
| | 13 | M | 45 | 450 | H1n | 86.7 | 0.15 | 86 | 72.9 | 0.19 | 221 | 36 |
| | 14 | C | 35 | 540 | H2n | 11.8 | 0.16 | 72 | 6.1 | 0.20 | 195 | 37 |
| | 15 | D | 100 | 550 | H2n | 33.2 | 0.27 | 140 | 26.8 | 0.31 | 231 | 29 |
| | 16 | G | 50 | 510 | H2n | 32.9 | 0.19 | 135 | 22.9 | 0.23 | 227 | 32 |
| | 17 | J | 105 | 580 | H2n | 13.6 | 0.29 | 120 | 8.6 | 0.34 | 235 | 34 |
| | 18 | K | 40 | 500 | H2n | 43.0 | 0.22 | 138 | 37.1 | 0.25 | 232 | 35 |
| Com. Ex. | 19 | B | 10 | 450 | H1n | 106.2 | 0.06 | 73 | 83.3 | 0.10 | 144 | 32 |
| | 20 | B | 80 | 430 | H1n | 114.3 | 0.07 | 86 | 88.5 | 0.10 | 163 | 27 |
| | 21 | O | 70 | 510 | H1n | 9.3 | 0.09 | 46 | 4.1 | 0.13 | 142 | 56 |
| | 22 | P | 70 | 510 | H1n | 30.8 | 0.08 | 81 | 25.2 | 0.11 | 164 | 33 |
| | 23 | Q | 60 | 510 | H1n | 6.3 | 0.07 | 41 | 3.8 | 0.12 | 160 | 82 |
| | 24 | R | 60 | 510 | H1n | 13.1 | 0.09 | 95 | 6.7 | 0.13 | 163 | 30 |
| | 25 | S | 60 | 460 | H1n | 121.4 | 0.25 | 182 | 97.6 | 0.09 | 148 | 28 |

TABLE 2-continued

| | | Laminated Aluminum Alloy Sheet | | | | | Laminated Aluminum Alloy Sheet After Heating Corresponding to Brazing | | | | |
|---|---|---|---|---|---|---|---|---|---|---|---|
| Division | No. | Code of Core Material Composition of Table 1 | Average Temperature Rise Rate in Soaking (400° C. or more) (° C./hr) | Soaking Temperature (° C.) | Temper | Number Density of Dispersoids of Core Material (/μm³) | Solid Solution Amount Ratio of Core Material Al Alloy Sheet | Average Grain Size of Core Material (μm) | Number Density of Dispersoids of Core Material (/μm³) | Solid Solution Amount Ratio of Core Material Al Alloy Sheet | Tensile Strength (MPa) | Erosion Depth (μm) |
| | 26 | T | 50 | 470 | H1n | 104.1 | 0.21 | 176 | 85.1 | 0.08 | 144 | 27 |
| | 27 | U | 50 | 590 | H1n | 9.4 | 0.12 | 48 | 5.4 | 0.07 | 147 | 49 |
| | 28 | V | 50 | 520 | H1n | 9.5 | 0.28 | 47 | 4.7 | 0.33 | 165 | 46 |
| | 29 | C | 12 | 470 | H2n | 118.4 | 0.08 | 48 | 91.4 | 0.12 | 142 | 48 |
| | 30 | G | 100 | 440 | H2n | 106.2 | 0.08 | 49 | 89.6 | 0.11 | 164 | 52 |
| | 31 | E | — | — | H1n | 112.6 | 0.07 | 184 | 21.9 | 0.08 | 174 | 25 |
| | 32 | B | 40 | 510 | H2n | 9.6 | 0.05 | 94 | 5.8 | 0.09 | 141 | 38 |
| | 33 | N | 15 | 560 | H1n | 9.8 | 0.06 | 73 | 4.6 | 0.10 | 160 | 35 |

As shown in Table 2, in the laminated sheets of Example Nos. 1 to 18, the requirements of the present invention were satisfied and therefore, the tensile strength was 180 MPa or more and the erosion depth was 40 μm or less. In other words, it was understood that the laminate sheet satisfying the requirements of the present invention is excellent in the strength (strength after brazing) and the erosion resistance.

On the other hand, in the laminated sheets of Comparative Example Nos. 19 to 33, any of the requirements specified in the present invention was not satisfied and therefore, good evaluations were not obtained.

Specifically, in the laminated sheets of Comparative Example Nos. 19 and 29, the average temperature rise rate in soaking (high-temperature region: 400° C. or more) was too slow, and therefore the number density of dispersoids before and after heating corresponding to brazing and the solid solution amount ratio (total solid solution amount/total addition amount) did not fall in the ranges specified in the present invention. Consequently, the tensile strength was less than 180 MPa (and with respect to Comparative Example No. 29, the erosion depth resulted in exceeding 40 μm).

In the laminated sheets of Comparative Example Nos. 20 and 30, the soaking temperature was too low, and therefore the number density of dispersoids before and after heating corresponding to brazing and the solid solution amount ratio (total solid solution amount/total addition amount) did not fall in the ranges specified in the present invention. Consequently, the tensile strength was less than 180 MPa (and with respect to Comparative Example No. 30, the erosion depth resulted in exceeding 40 μm).

In the laminated sheets of Comparative Example Nos. 21 to 28, the core material composition failed in satisfying the requirements of the present invention, and therefore at least one of the number density of dispersoids before and after heating corresponding to brazing and the solid solution amount ratio (total solid solution amount/total addition amount) did not fall in the ranges specified in the present invention. Consequently, the tensile strength was less than 180 MPa (and the erosion depth resulted in exceeding 40 μm).

The laminated sheet of Comparative Example No. 31 is, as described above, a laminated sheet manufactured by the method described in Patent Document 1, where unlike the conditions for the manufacture of the laminated sheet of the present invention, soaking was not performed. Accordingly, in the laminated sheet of Comparative Example No. 31, the number density of dispersoids before and after heating corresponding to brazing and the solid solution amount ratio (total solid solution amount/total addition amount) did not fall in the ranges specified in the present invention. Consequently, the tensile strength was less than 180 MPa.

The laminated sheet of Comparative Example No. 32 is, as described above, a laminated sheet manufactured by the method described in Patent Document 2, where unlike the conditions for the manufacture of the laminated sheet of the present invention, rough annealing was performed under predetermined conditions. Accordingly, in the laminated sheet of Comparative Example No. 32, the solid solution amount ratio (total solid solution amount/total addition amount) before and after heating corresponding to brazing did not fall in the range specified in the present invention. Consequently, the tensile strength was less than 180 MPa.

The laminated sheet of Comparative Example No. 33 is, as described above, a laminated sheet manufactured by the method described in Patent Document 3, and although the average temperature rise rate in soaking is not described, the condition for obtaining mechanical properties equal to Patent Document 3 was that the average temperature rise rate at 400° C. or more is 15° C./hr. This condition is outside the range of the condition of the present invention, and in the laminated sheet of Comparative Example No. 33, the number density of dispersoids before and after heating corresponding to brazing and the solid solution amount ratio (total solid solution amount/total addition amount) did not fall in the ranges specified in the present invention. Consequently, the tensile strength was less than 180 MPa.

While the present invention has been described in detail and with reference to specific embodiments thereof, it will be apparent to one skilled in the art that various changes and modifications can be made therein without departing from the spirit and scope of the present invention.

The present application is based on a Japanese patent application filed on Mar. 31, 2014 (Application No. 2014-074199), the contents thereof being incorporated herein by reference.

INDUSTRIAL APPLICABILITY

The laminated aluminum alloy sheet of the present invention is excellent, for example, in the strength after brazing and the erosion resistance and is useful for a heat exchanger of an automobile, etc.

The invention claimed is:

1. A laminated aluminum alloy sheet, comprising a core material and a sacrificial material being clad on at least one side surface of the core material,
wherein:
the core material comprises
Mn: from 0.5 to 1.8 mass %,
Si: from 0.4 to 1.5 mass %,
Cu: from 0.05 to 1.2 mass %,
Mg: from 0 to 1.0 mass %,
at least one of
Fe: more than 0 mass % and 1.0 mass % or less, and
Ti: more than 0 mass % and 0.3 mass % or less, and
Al and unavoidable impurities;
the core material has a number density of dispersoids having a particle diameter of 0.01 to 0.5 µm of from 10 to 100/µm$^3$; and
the core material has a ratio of a total solid solution amount of the Mg, the Mn, the Si, and the Cu to a total addition amount of the Mg, the Mn, the Si, and the Cu of 0.10 or more.

2. The laminated aluminum alloy sheet according to claim 1, wherein the core material further comprises at least one of (a) and (b):
(a) at least one of
Cr: from 0.02 to 0.4 mass % and
Zr: from 0.02 to 0.4 mass %; and
(b) Zn: more than 0 mass % and 1.0 mass % or less.

3. The laminated aluminum alloy sheet according to claim 1, wherein:
the core material has, as a microstructure after a heating corresponding to a brazing of the laminated aluminum alloy sheet, a number density of dispersoids having a particle diameter of 0.01 to 0.5 µm of from 5 to 80/µm$^3$;
the core material has, as the microstructure, an average grain size in a rolling direction, in a longitudinal cross-section along the rolling direction, of 50 µm or more; and
the core material has, as the microstructure, a ratio of a total solid solution amount of the Mg, the Mn, the Si, and the Cu to a total addition amount of the Mg, the Mn, the Si, and the Cu of 0.14 or more.

4. The laminated aluminum alloy sheet according to claim 2, wherein:
the core material has, as a microstructure after a heating corresponding to a brazing of the laminated aluminum alloy sheet, a number density of dispersoids having a particle diameter of 0.01 to 0.5 µm of from 5 to 80/µm$^3$;
the core material has, as the microstructure, an average grain size in a rolling direction, in a longitudinal cross-section along the rolling direction, of 50 µm or more; and
the core material has, as the microstructure, a ratio of a total solid solution amount of the Mg, the Mn, the Si, and the Cu to a total addition amount of the Mg, the Mn, the Si, and the Cu of 0.14 or more.

5. The laminated aluminum alloy sheet according to claim 1, wherein the core material comprises 0.8 mass % or less of Mg.

6. The laminated aluminum alloy sheet according to claim 1, wherein the core material comprises from 0.05 to 1.0 mass % of Mg.

7. The laminated aluminum alloy sheet according to claim 1, wherein the core material comprises from 0.1 to 1.0 mass % of Mg.

8. The laminated aluminum alloy sheet according to claim 1, wherein the ratio of a total solid solution amount of the Mg, the Mn, the Si, and the Cu to a total addition amount of the Mg, the Mn, the Si, and the Cu is from 0.1 to 0.7.

9. The laminated aluminum alloy sheet according to claim 2, wherein the core material comprises from 0.01 to 0.8 mass % of Fe.

10. The laminated aluminum alloy sheet according to claim 2, wherein the core material comprises from more than 0 mass % to 0.2 mass % of Ti.

11. The laminated aluminum alloy sheet according to claim 2, wherein the core material comprises from 0.02 to 0.4 mass % of and from 0.02 to 0.4 mass % of Zr.

12. The laminated aluminum alloy sheet according to claim 2, wherein the core material comprises from 0.01 to 0.8 mass % of Zn.

13. The laminated aluminum alloy sheet according to claim 3, wherein the average grain size is 80 µm or more.

14. The laminated aluminum alloy sheet according to claim 3, wherein the average grain size is from 50 µm to 250 µm.

15. The laminated aluminum alloy sheet according to claim 3, wherein the average grain size is from 50 µm to 200 µm.

* * * * *